United States Patent [19]
Nakamoto et al.

[11] 4,057,809
[45] Nov. 8, 1977

[54] EXPOSURE CONTROL CIRCUIT

[75] Inventors: Soichi Nakamoto, Machida; Tadashi Ito; Fumio Ito, both of Yokohama; Nobuhiko Shinoda, Tokyo, all of Japan

[73] Assignee: Canon Kabushiki Kaisha, Tokyo, Japan

[21] Appl. No.: 666,458

[22] Filed: Mar. 12, 1976

[30] Foreign Application Priority Data

Mar. 18, 1975 Japan .................. 50-32616

[51] Int. Cl.² ............................. G03D 7/08
[52] U.S. Cl. .................. 354/23 D; 354/24; 354/50; 354/51; 354/60 A
[58] Field of Search ............ 354/23 D, 24, 50, 51, 354/60 R, 60 A

[56] References Cited
U.S. PATENT DOCUMENTS 3,748,979  7/1973  Wada .................. 354/23 D
3,990,086  11/1976 Mori et al. ............. 354/51

Primary Examiner—Russell E. Adams
Attorney, Agent, or Firm—Toren, McGeady and Stanger

[57] ABSTRACT

This invention relates to photographic cameras, and more particularly to an exposure control circuit of the type in which an analog output representative of the object brightness level is converted to a digital signal which is factored into an exposure value, and the period of actuation of the camera shutter is controlled in accordance with this exposure value. Still more particularly, it relates to an improvement over this conventional type exposure control with respect to the A-D conversion. The prior art converts a voltage representative of the object brightness to a digital form by the use of an A-D converter such as of the follow comparison type which is characterized by the lack of integrating aspect in converting the input voltage to the corresponding digital signal. Therefore, when the illumination for the object being photographed is caused to flicker in a period of time shorter than the effective exposure time interval, an alternating current component is introduced into the input voltage of the converter. Accordingly, it is made impossible to effect accurate exposure control based on the digital signal representing the only object brightness level. The invention provides an exposure control circuit which is not susceptible of this alternate current component as it is removed in the course of the A-D conversion.

15 Claims, 5 Drawing Figures

EXPOSURE CONTROL CIRCUIT

FIELD OF THE INVENTION

This invention relates to digital exposure control circuits for use in photographic cameras, and, more particularly, to an exposure control circuit which performs exposure control as stabilized against the variation with time of output of the light metering circuit.

DESCRIPTION OF THE PRIOR ART

It is known to provide a digitally processing exposure control circuit for use in a photographic camera having an analog-to-digital (hereinafter abbreviated as A-D) converter of the follow comparison type arranged to convert the output of the sensor circuit to a digital signal which is factored into an exposure value in accordance with which the exposure control is effected. This system, however, because of the point-to-point conversion of ever-varying outputs of the sensor circuit into the corresponding digital values, gives rise to a problem such that when the output of the sensor circuit is varied to a serious extent for the accurate exposure control within the duration of the effective exposure time interval, the outputs of the sensor circuit can not be averaged prior to the A-D conversion to effect the derivation of exposure value based on the one of the outputs of the sensor circuit which is different from that representative of the average object brightness level. An example of such serious photographic situations is to illuminate an object being photographed by the use of an aritificial lighting source such as luminescent discharge tubes energized by alternating current. In this case, the object brightness is caused to vary at a certain frequency which in turn results in variation of the output of the sensor circuit at the same frequency. When a follow comparison type A-D converter is used to convert the output of the sensor circuit into a digital signal with a magnitude in the point-to-point relation, the magnitude of the digital signal is constituted with the alternating current component which is to lead to the impossibility of accurate exposure control due to the derivation of an effective exposure value from a particular and frequently unsuitable light metering result. In order to overcome this problem, a method has been proposed to cancel the above identified alternating current component by the addition of the output of the sensor circuit to the inverted one thereof. According to this method, however, the alternating current component must be cancelled from the output of the sensor circuit prior to its introduction to the A-D converter circuit. To achieve this, a particular circuit is necessary only for the purpose of removing the alternate current component but which has no direct relation to the improvement of the exposure control, thereby giving a disadvantage of making the entire circuit construction and arrangement more complicate.

SUMMARY OF THE INVENTION

Accordingly, the present invention has for a general object the provision of an exposure control circuit which has overcome the above mentioned conventional drawbacks.

Another object of the invention is the provision of an exposure control circuit in which the A-D converter circuit for A-D conversion of the output of the sensor circuit is constructed as including an integrating circuit arranged to remove the above identified alternating current component at the stage of the A-D conversion.

Another object of the invention is the provision of an exposure control circuit in which there is provided an A-D converter including an integrating circuit selectively responsive to either of the outputs of the sensor circuit and a reference voltage source upon connection to the sensor circuit to integrate the output of the sensor circuit during a predetermined period of time, change-over means for effecting the selection, and a comparator connected to the output terminal of the integrating circuit, whereby the time interval between the termination of duration of the integration time period and the time at which the comparator produces an output is a function of the average of ever-varying outputs of the sensor circuit. This time interval is utilized to effect the A-D conversion as permitting application of pulses of a predetermined frequency to a counter.

Other objects and features of the invention will become apparent from the following detailed description taken in conjunction with the accompanying drawings in which:

DESCRIPTION OF THE PREFERRED EMBODIMENTS

Figure 1:
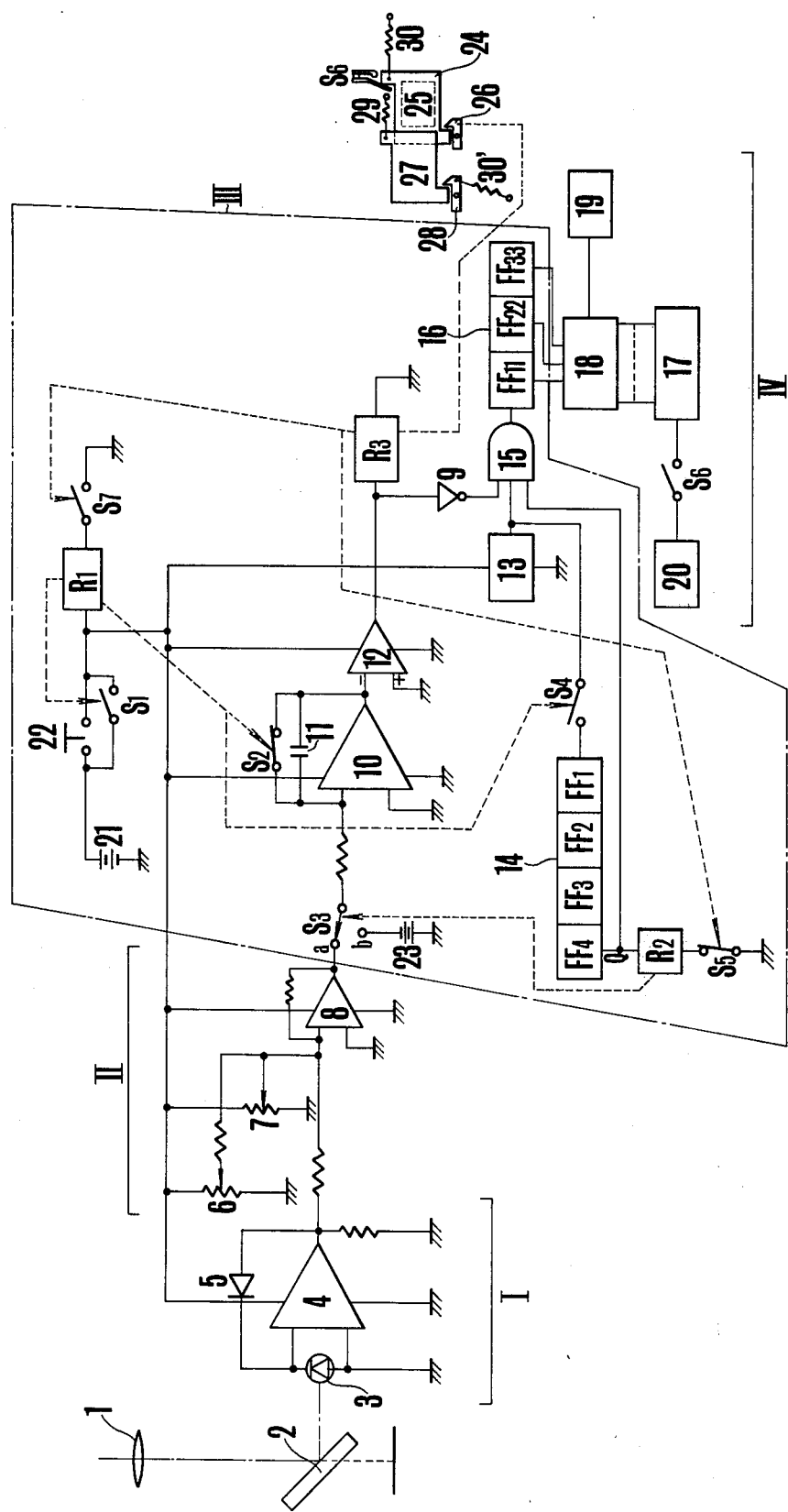
FIG. 1 is a schematic diagram of one embodiment of an exposure control circuit according to the invention.

Referring to FIG. 1, there is shown one embodiment of an exposure control circuit for use in a camera, said camera having an objective lens 1 and a reflex mirror 2 in its viewing position, as comprising a sensor circuit I, a computer circuit II, an A-D converter circuit III and a digitally operated shutter control circuit IV. The sensor circuit comprises a photosensitive element 3 such as a silicon blue cell arranged in a viewfinder optical system to receive light passing through the objective lens 1 and reflected from the mirror 2, an operational amplifier 4 having two input terminals between which the photosensitive element 3 is connected, and a diode 5 connected in the feedback network of the operational amplifier 4 to constitute a log amplifier.

The computer circuit II comprises a first variable resistor 6 connected betwen a positive bus and earth and cooperative with a film speed setting dial, not shown, to provide a resistance value proportional to the logarithm of the reciprocal of the film speed value selected thereon which is referred to as $-Sv$; a second variable resistor 7 connected between the positive bus and earth and cooperative with a not shown diaphragm ring to provide a resistance value proportional to the logarithm of the diaphragm value selected thereon which is referred to as Av, and an operational amplifier 8 responsive to the outputs of the log amplifier and the variable resistors 6 and 7 for producing an exposure value in the form of a voltage with magnitude proportional to the logarithm of the reciprocal of an effective expsoure time which is referred to as $-Tv$.

The A-D conversion system III enclosed by the dot-and-dash lines comprises an operational amplifier 10 having an input terminal connected to the output terminal of the computer circuit II through a circuit-transfer switch $S_3$ serving as a changeover means mentioned before, a condenser 11 connected in the feedback network of the operational amplifier 10, the parts 10 and 11 constituting a Miller integrating circuit, a comparison circuit 12 having two input terminals one of which is connected to the output terminal of the Miller integrating circuit and the other of which is grounded, a clock pulse generator 13, a first 4-bit binary counter 14 consisting of four flip-flops $FF_1$, $FF_2$, $FF_3$ and $FF_4$ and connected to the pulse generator 13 through a switch $S_4$, and a second 3-bit binary counter 16 consisting of three flip-flops $FF_{11}$, $FF_{22}$ and $FF_{33}$ and connected through an AND gate 15 to the clock pulse generator 13, one of the two gating control input terminals of the AND gate 15 being connected through an inverter 9 to the output terminal of the comparison circuit 12 and the other gating control input terminal being connected to the output terminal Q of the first binary counter 14. There are further provided three relays $R_1$, $R_2$ and $R_3$, the first relay $R_1$ being arranged so that when a start button 22 is pushed down, the first relay $R_1$ is energized from a power source battery 21 through a normally closed switch $S_7$ and the pushed start switch 22, thereby a normally open switch $S_1$ connected in parallel with the start switch 22 and the normally open switch $S_4$ are closed and a normally closed switch $S_2$ connected across the condenser 11 is opened. The second relay $R_2$ is connected between the output terminal Q of the first binary counter 14 and a grounded switch $S_5$ is arranged to cooperate with the circuit-transfer switch or changeover means $S_3$ in such a manner that when the relay $R_2$ is energized, the changeover means $S_3$ is moved from a position "a" to a position "b" for connection with the negative terminal of a battery 23 serving as a reference voltage source with a magnitude of —Es. The third relay $R_3$ is connected between the output terminal of the comparison circuit 12 and grounded and is arranged to cooperate with the switches $S_5$ and $S_7$ and also with a front curtain latching member 26 in such a manner that when the relay $R_3$ is energized from the output of the comparison circuit 12, the normally closed switches $S_5$ and $S_7$ are opened and the front shutter curtain 24 is released from the latching member 26 to run down past an exposure aperture 25 to the fully open position under the action of a spring 30.

The shutter control circuit IV comprises a binary counter 17 connected to a clock pulse generator 20 of the same pulse frequency as that of the above mentioned pulse generator 13 through a switch $S_6$, the switch $S_6$ being arranged to be closed when the front shutter curtain is initiated to run down, a detecting circuit 18 capable, upon establishment of a predetermined relation between the content stored in the second binary counter 16 and the count of the counter 17, of producing an output, and a switching circuit 19 responsive to the output of the detecting circuit 18 for causing the running-down movement of the rear shutter curtain 27 under the action of a spring 29 as a latching member 28 which is biased by a spring 30' is actuated.

Figure 2:
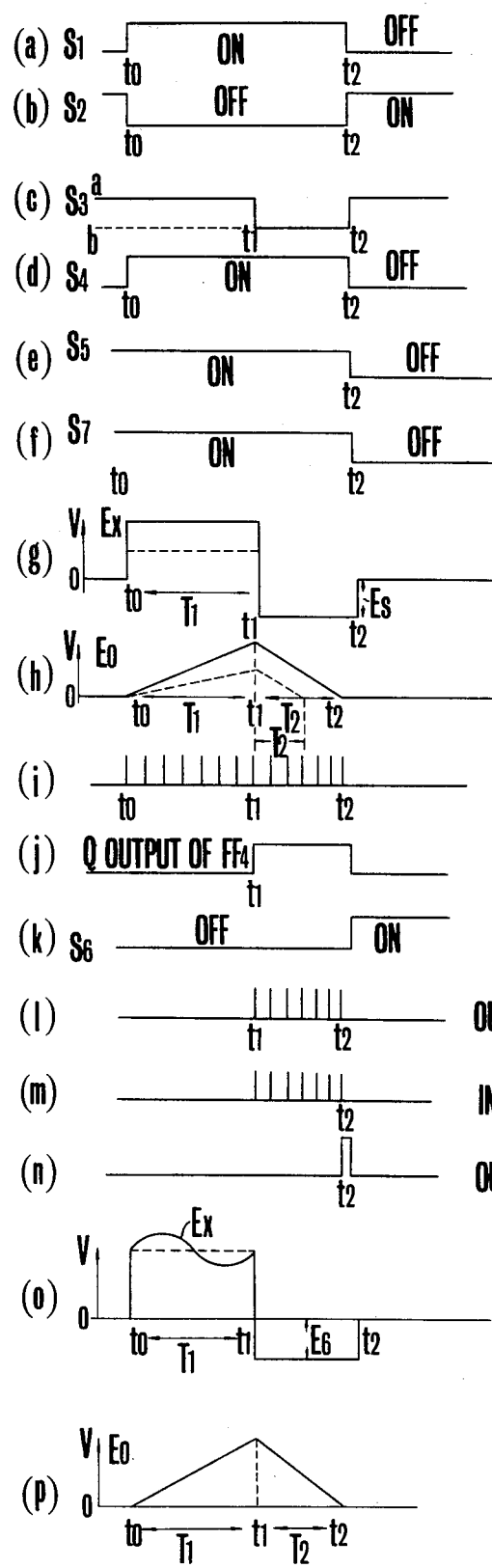
FIG. 2 is a graphic plot of the waveforms which illustrate the operation of the circuit of FIG. 1.

The operation of the exposure control circuit of FIG. 1 will next be explained by reference to FIG. 2. Upon depression of the start button 22 at a time $t_0$, the first relay $R_1$ is energized with current flowing from the power source battery 21 to turn on switches $S_1$ and $S_4$ as shown at (a) and (d) in FIG. 2, but to turn off switch $S_2$ as shown at (b) in FIG. 2. As switch $S_1$ is closed, the energization of relay $R_1$ is retained even after the operator removes his finger from the start button 22, until switch $S_7$ is opened. The closure of start switch 22 and the subsequent closure of switch $S_1$ cause the sensor circuit I, computer circuit II and A-D conversion system III to be rendered operative through the common positive bus. Now assuming that the level of brightness of an object being photographed is maintained constant at least during the exposure time interval, the sensor circuit I produces an output in the form of a voltage proportional to the logarithm of reciprocal of the object brightness level which is referred to as —Bv. This output is then combined with the voltages proportional to —Sv and Av from variable resistors 6 and 7 respectively by operational amplifier 8 to produce an output voltage Ex representative of an effective exposure value and proportional to —Tv = —Bv — Sv + Av, as shown at (g) in FIG. 2. As switch $S_2$ is opened at time $t_0$, therefore, the Miller integrating circuit begins to integrate the output voltage Ex of the computer circuit to produce a ramp voltage having a slope dependent upon the object brightness level alone, provided that the film speed and diaphragm aperture are held fixed. On the other hand, as switch $S_4$ is closed to apply a clock pulse train from clock pulse generator 13 to the first binary counter 14. The first binary counter 14, because of its 4-bit constitution of four flip-flops $FF_1$, $FF_2$, $FF_3$ and $FF_4$, produces an output at the terminal Q of $FF_4$ every 8 pulses. In other words, when the 8th clock pulse counting from the time $t_0$ occurs at a time $t_1$, the output Q of counter 14 is applied to the second relay $R_2$ and AND gate 15. The energization of second relay $R_2$ causes the circuit-transfer switch $S_3$ to be set from its "a" position to its "b" position where a negative potential is applied from the reference voltage source 23 to the input terminal of the Miller integrator 10, 11. At the time $t_1$, the ramp function $E_0(t)$ reaches a voltage level defined by the following formula:

$$E_0(t_1) = \frac{1}{CR} \int_{t_0}^{t_1} Ex\, dt = \frac{T_1}{CR} Ex \qquad (1)$$

wherein $T_1 = t_1 - t_0$

Since the frequency of the pulses from the clock pulse generator 13 is given as constant, that is, $T_1$ is constant along with C and R, the value $E_0(t_1)$ is a function of the input voltage Ex alone. As the reference voltage —Ex of opposite polarity to that of the output Ex of the computer is applied to the Miller integrator at time $t_1$, the ramp function $E_0(t)$ is refracted as shown at (h) in FIG. 2, reaching zero potential at time $t_2$. Hence, $$E_0(t_2) = \frac{T_1}{CR} Ex - \int_{t_1}^{t_2} \frac{Es}{RC} dt = \frac{T_1}{CR} Ex - \frac{Es(t_2 - t_1)}{RC}$$

so that the period of time $T_2\,(= t_2 - t_1)$ necessary for $E_0(t)$ to be decreased from the maximum to zero is obtained by the following formula $$(T_1/CR)\, EX - (EsT_2/RC) = 0 \ldots \qquad (3)$$

$$T_2 = T_1 Ex/Es \ldots \qquad (4)$$

thus, the time period $T_2$ is dependent upon the output voltage of the computer alone.

As the output of first counter 14 is applied to one of the two gating control inputs of AND gate 15 at time $t_1$, while the other gating control input of the AND gate is supplied with the output of the comparison circuit 12 after inverted by the inverter 9 to a logic value "1", the clock pulse train from the generator 13 is initiated to be applied past the AND gate 15 to the second binary counter 16 at time $t_1$. After the duration of the time period $T_2$ from time $t_1$, that is, at time $t_2$, the ramp down function $E_0(t)$ reaches zero potential so that the comparison circuit 12 is inverted to produce an output which is inverted by the invertor 9 to a logic value "0", and then the AND gate 15 is closed. Therefore, the number of pulses entered in the second binary counter 16 is proportional to the period of time $T_2$, that is, to the variable Ex of formula (4) as shown in FIG. 2(m). Thus, the exposure value derived as an analog signal from the computer circuit II and representing, in this instance, the time interval to which the camera shutter is to be adjusted is converted to a binary coded digital signal which is stored in the second binary counter 16.

Upon advent of the output of comparison circuit 12 on the third relay $R_3$, that is, at time $t_2$, the normally closed switches $S_5$ and $S_7$ associated with first and second relays $R_1$ and $R_2$ respectively are opened to return switches $S_1$, $S_2$, $S_3$ and $S_4$ to their initial states, and the latching member 26 is actuated to release the front shutter curtain from the latched position, thereby the exposure of the film behind the exposure aperture 25 is initiated. Just after the initiation of the running-down movement of the front curtain 24, switch $S_6$ is closed to apply a pulse train from the pulse generator 20 to the binary counter 17. When the number of pulses entered in counter 17 has reached a predetermined relation to that of pulses stored in counter 16, the detecting circuit 18 produces an output which is then applied to the switching circuit 19 to cause the running-down movement of the rear shutter curtain 27.

Alternately assuming that the object brightness level is varied periodically in the duration of the exposure time interval as the object is illuminated by the use of an artificial lighting source such as a luminescent discharge tube energized by an alternating current of 50 cycles/-sec. or with a period of 10 milliseconds, the output Ex of operational amplifier 8 varies at the same frequency as the above as shown in FIG. 2(o), wherein one cycle period is shown as coincident with the time interval $T_1$. When the Miller integrator is rendered operative in this state, the output $E_0$ of Miller integrator, because of the integration of Ex which leads to the cancelling of the alternating current component sections with each other at time $t_1$, is rid of the variation of illumination. Subsequently, the A-D conversion proceeds in a manner similar to that described above so that a digital signal stored in counter 16 is independent of the variation of the object brightness level to permit operation of accurate exposure control. In order to achieve an improvement in the acccuracy of the exposure control regardless of the periodic variation of the object brightness level, it is required to adjust the integration time interval $T_1$ of Miller integrating circuit to a natural number times the period of variation of the object brightness level.

Figure 3:
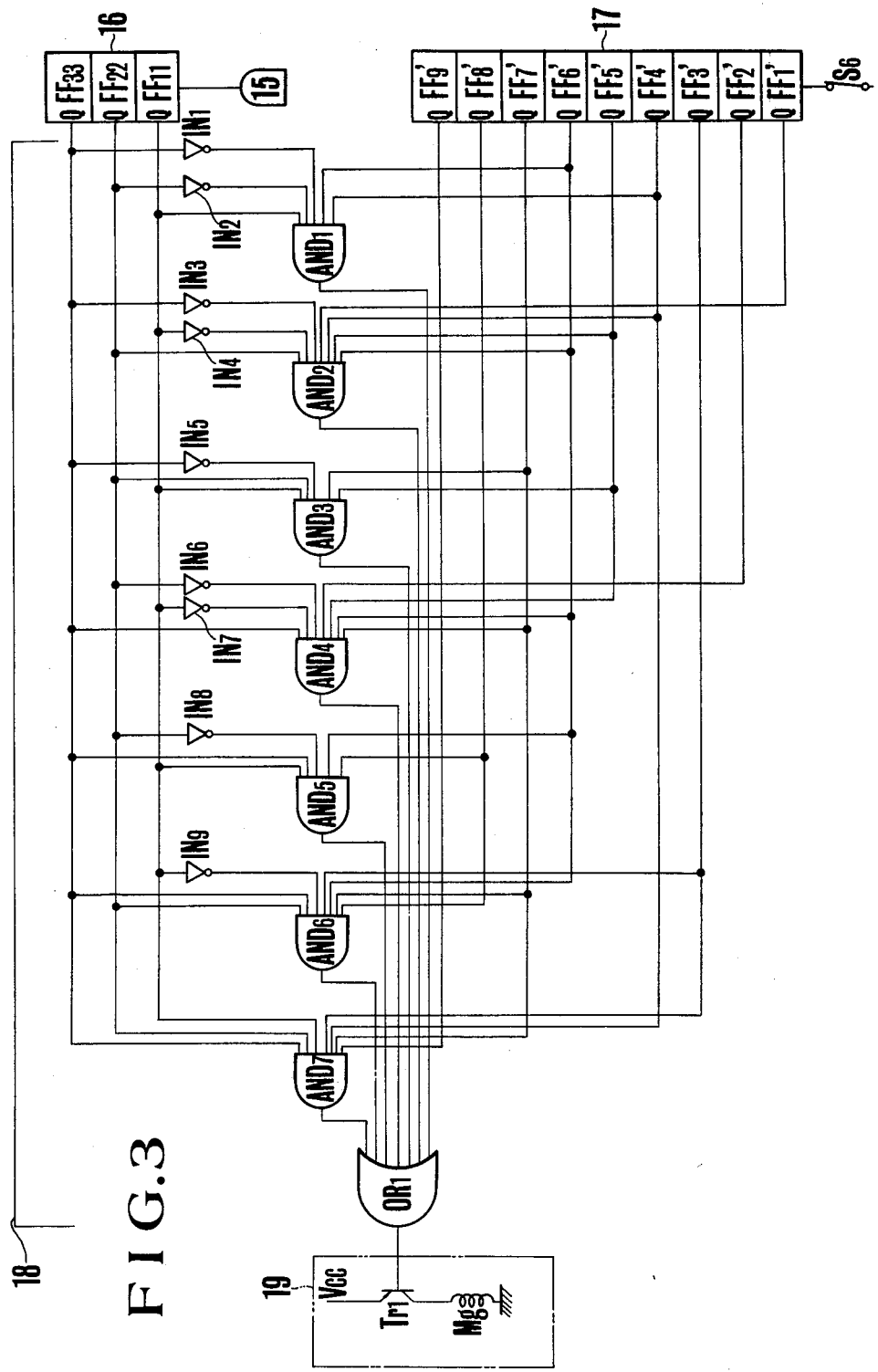
FIG. 3 is a circuit diagram showing an example of the shutter control circuit IV of FIG. 1.

FIG. 3 shows an example of construction and arrangement of various circuit elements of the shutter control circuit IV of FIG. 1, wherein the second binary counter and AND gate of FIG. 1 are indicated at 16 and 15 respectively. The binary counter 17 is shown as comprising nine flip-flops $FF'_1$ to $FF'_9$. Connected between these binary counters 16 and 17 is a detecting circuit 18 having a function of converting a digital signal representative of the logarithm of reciprocal of an effective shutter speed value to a digital signal of duration equal to this effective shutter speed value. The detecting circuit 18 comprises seven AND gates AND1 to AND7, nine inverters $IN_1$ to $IN_9$, and one OR gate $OR_1$, these parts being arranged so that when the number of pulses entered in counter 16 is, for example, three, because of the high light level, in other words, when $FF_{11}$ and $FF_{22}$ produce outputs Q of logic value "1" and $FF_{33}$ produces an output Q of logic value "0", the count of the 80th pulse by the binary counter 17 counting from the time at which the running-down movement of the front shutter curtain is initiated to close switch $S_6$ between the counter 17 and a clock pulse generator 20 causes flip-flops $FF'_5$ and $FF'_7$ to produce outputs Q of logic value "1", whereby AND gate AND 3 produces an output which is applied at the OR gate $OR_1$. The output of OR gate $OR_1$ has a logic value "1" which is applied to the base electrode of a transistor $Tr_1$ constituting part of the switching circuit 19, thereby the transistor $Tr_1$ is turned off to deenergize the solenoid of an electromagnet Mg associated with the rear curtain latching member 28 of FIG. 1. As the latching member 28 is moved away from the electromagnet Mg, the rear shutter curtain begins to run down to the exposure aperture-closed position.

Figure 4:
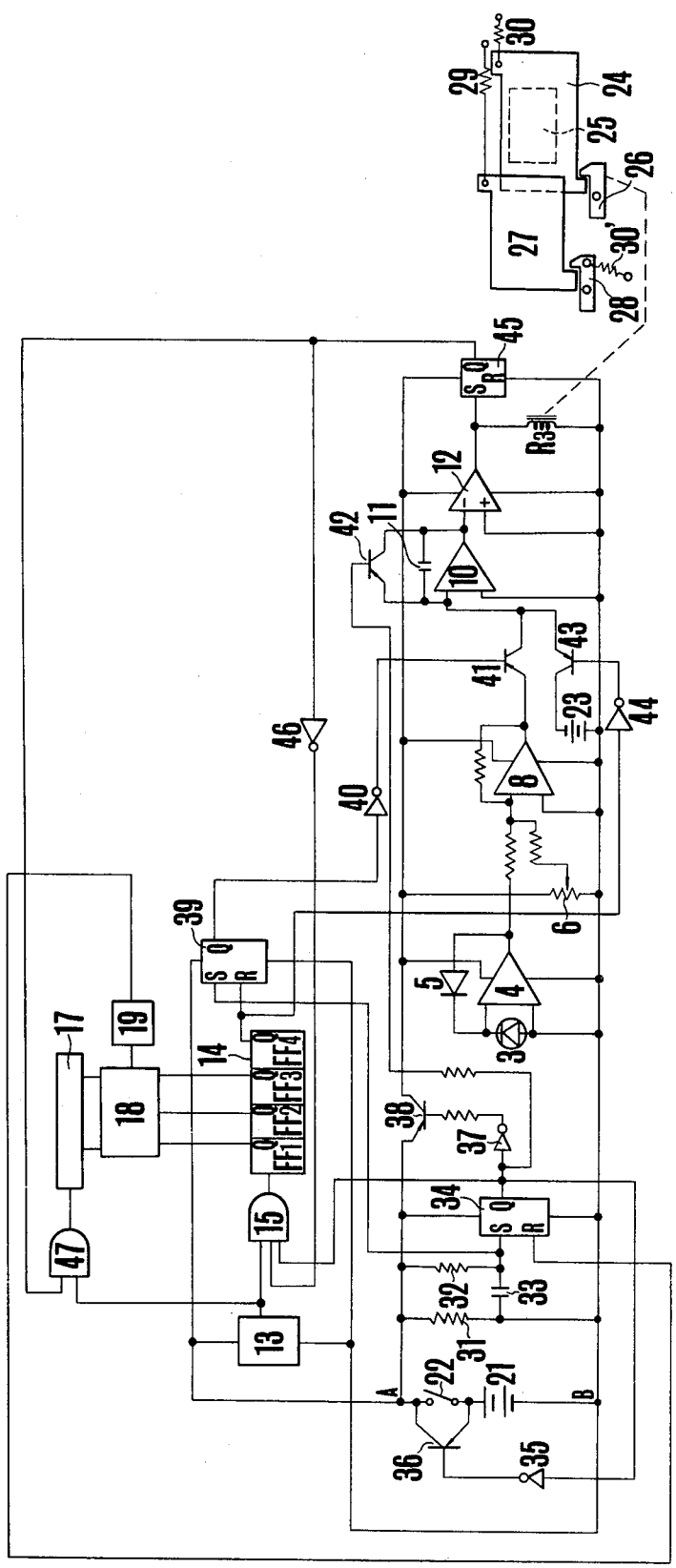
FIG. 4 is a schematic diagram of another embodiment of an exposure control circuit according to the invention.
Figure 5:
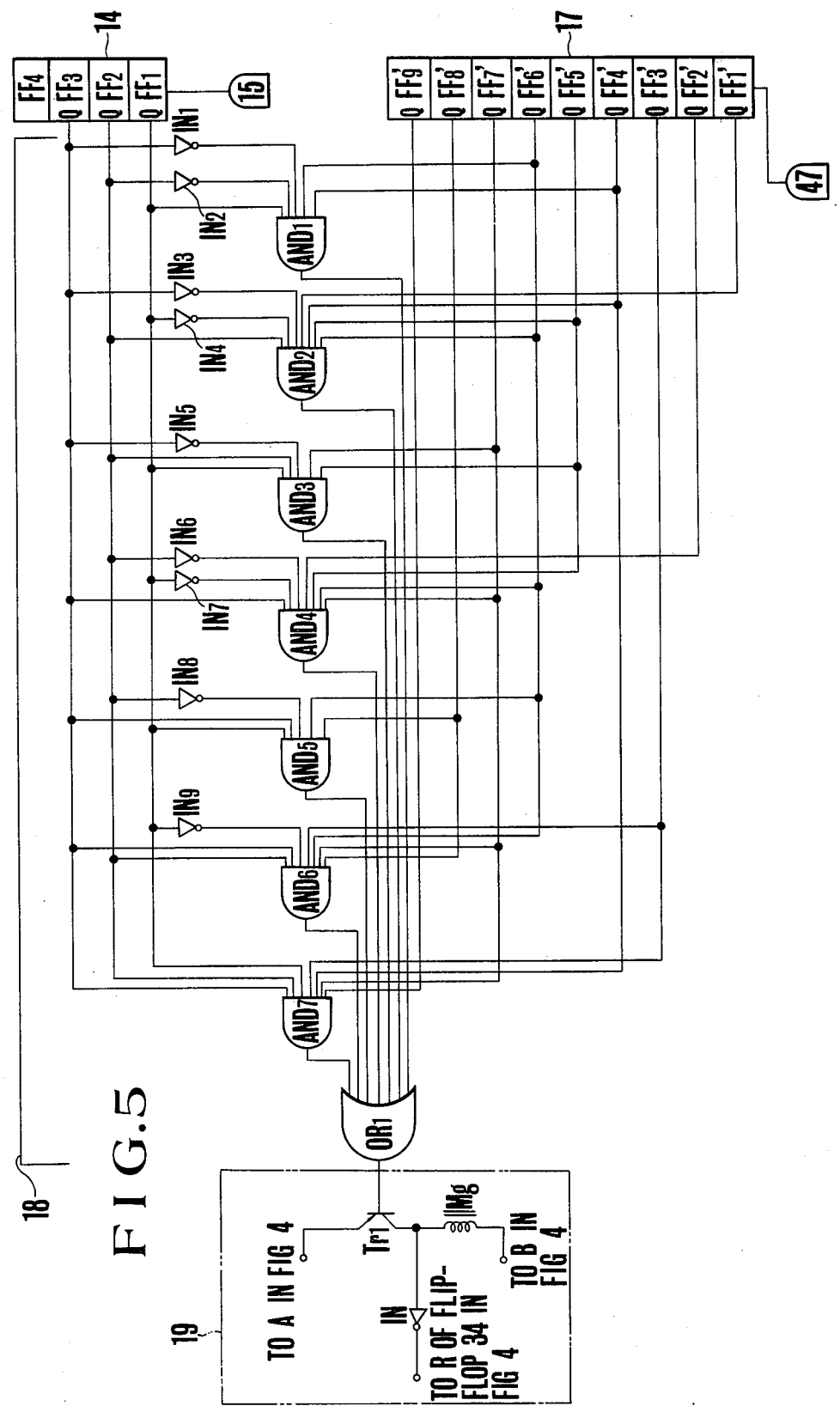
FIG. 5 is a circuit diagram showing an example of the shutter control circuit IV of FIG. 4.

FIG. 4 shows another embodiment of an exposure control circuit according to the present invention which remains substantially unchanged from the embodiment of FIG. 1 except the points that the various mechanical switches and their actuating members of the relay type are replaced by electronic switches and actuating circuits therefor and that the second binary counter 16 is removed and in which the same reference characters have been employed to denote the similar parts to those of FIG. 1. Connected in parallel with the start switch 22 is a switching transistor 36 having a base electrode connected through an inverter 35 to the output terminal Q of a first flip-flop 34. The set terminal S of flip-flop 34 is connected to the output terminal of a differentiation circuit comprised of two resistors 31 and 32 and a capacitor 33 and connected across the power source battery 21 through the parallel-connected switches 22 and 36. The output terminal Q of flip-flop 34 is also connected both to the base electrode of a power supply control transistor 38 through an inverter 37 and to the base electrode of a switching transistor 42 controlling operation of Miller integrator 10, 11. The second relay $R_2$ of FIG. 1 is replaced by a second flip-flop 39 having an output terminal Q connected through an inverter 40 to the base electrode of a switching transistor 41 connected between the output terminal of the computer circuit II and the input terminal of Miller integrator to constitute the above mentioned change-over means corresponding to the circuit transfer switch $S_3$ of FIG. 1 together with a switching transistor 43. The switching transistor 43 is connected between the negative electrode of a reference voltage source 23 and the input terminal of Miller integrator and has a base electrode connected through an inverter 44 to the reset terminal R of the second flip-flop 39. There is provided a third flip-flop 45 having a set terminal S connected to the output terminal of the comparison circuit 12, and having an output terminal Q connected through an inverter 46 to one of the two gating control terminals of the AND gate 15 of FIG. 1 and also connected directly to the single gating control input terminal of an AND gate 47. The AND gate 47 is connected between the clock pulse generator 13 and the binary counter 17, serving as the switch $S_6$. A relay $R_3$ is provided as connected between the output terminal of comparison circuit 12 and the negative bus and arranged to be cooperative with the front shutter curtain latching member 26. 24 is a front shutter curtain, 25 is an exposure gate, 27 is a rear shutter curtain, 28 is a rear curtain latching member cooperative with a magnet of FIG. 5 to be described, 29 is a spring connected to the rear shutter curtain to serve as a drive member therefor, 30 is a spring connected to the front shutter curtain to serve as a drive member therefor, and 30' is a bias spring connected to the latching member 28. The reset terminal of the second flip-flop 39 is connected to the output terminal Q of the first binary counter 14. The reset terminal of the first flip-flop 34 is connected through an inverter IN to the output terminal of the transistor $Tr_1$ of the switching circuit 19 as shown in FIG. 5. FIG. 5 shows an example of a switching circuit usuable in the circuit 19 of FIG. 4, while the circuit 18 of FIG. 5 is shown as identical to the detecting circuit of FIG. 3. The different point from FIG. 4 is that the terminals A and B of battery 21 are connected to the emitter and collector electrodes of the transistor $Tr_1$ respectively, and the inverter IN is connected between the collector electrode of transistor $Tr_1$ and the reset terminal R of the first flip-flop 34.

The operation of the circuit of FIGS. 4 and 5 is as follows. When a shutter release button not shown is depressed to close the switch 22, the differentiation circuit produces a pulse which is applied to the set terminals of the first and second flip-flops 34 and 39. As the first flip-flop 34 is set, the transistor 36 is turned on because of application of logic value "0" to the base electrode thereof to retain the power supply to the various circuit sections regardless of the subsequent opening of the switch 22, and at the same time the transistor 38 is turned on to render operative the sensor circuit, computer circuit and A-D converter circuit. As the second flip-flop 39 is set, the transistor 41 is turned on to apply the output of the operational amplifier 8 to the Miller integrating circuit. At this time, the transistor 42 remains in OFF state because of the output of first flip-flop 34, permitting operation of the Miller integrating circuit in a manner similar to that described in connection with FIGS. 1 and 2. At time $t_0$ when the Miller integrator initiates to operate, the two gating control input terminals of the AND gate 15 are supplied with the output of first flip-flop 34 and with the output of third flip-flop 45 through its inverter 46 respectively to be gated on to pass the pulse train from the pulse generator 13 to the binary counter 14. Upon advent of the 8th pulse on the counter 14, its flip-flop element $FF_4$ produces an output which is applied to the reset terminal of the second flip-flop 39, thereby the base electrode of transistor 41 is supplied with logic "1" signal to be turned off. At this time, the transistor 43 is turned on by the output of the second counter 14 after inverted by the inverter 44, thereby the negative voltage $-Es$ of the reference voltage source 23 is applied to the input terminal of the Miller integrator at time $t_1$. From time $t_1$ onward, the Miller integrator performs an inverted integration until the termination of duration of a time interval $T_2$ defined in the first embodiment of FIGS. 1 and 2. At time $t_2$, the output of Miller integrator reaches zero level, causing production of an output from the comparison circuit 12, thereby the relay $R_3$ is actuated to release the front shutter curtain from the engagement with the latching lever 26 to initiate an exposure. At time $t_2$, it is also effected to set the third flip-flop 45 by the output of the comparison circuit 12 to close the AND gate 15. For this reason, the content of the flip-flops $FF_1$, $FF_2$ and $FF_3$ of the second binary counter 14 corresponds to the object brightness level. In other words, at time $t_1$, all the flip-flops $FF_1$, $FF_2$ and $FF_3$ have contents of logic value "0", so that the content of the counter 14 is dependent upon the number of pulses entered therein during the time interval between times $t_1$ and $t_2$. To set the third flip-flop 45, that is, at time $t_2$, the AND gate 47 is opened to pass the pulse train from the generator 13 to the binary counter 17. Responsive to the establishment of a predetermined relationship between the contents of the counters 14 and 17, the detecting circuit 18 produces an output as described in detail in connection with FIGS. 1 and 3. When this output is applied to the base electrode of the transistor $Tr_1$, the solenoid of an electromagnet Mg is deenergized causing the rear shutter curtain to run down to the exposure gate-closed position. At this time, also the first flip-flop 34 is reset by the inverted output of the transistor $Tr_1$ by the inverter IN and the transistor 36 is turned off to stop the power supply from the battery 21 to the various circuit sections.

It will be seen from the foregoing detailed description that the present invention contemplates the use of a novel A-D conversion system in a digital exposure control circuit for permitting the counter to count the number of pulses proportional to the voltage level to which the sensed signal from the sensor circuit is integrated during a predetermined time interval, whereby the alternating current component of the sensed signal due to the variation of the object brightness level, if any, can be eliminated to effect exposure control with improved accuracy and reliability as stabilized against the illumination variation. Further, the digital signal corresponding to the derived exposure value from the object brightness level is obtained in the course of the inverted integration by the same integrating circuit as that used to integrate the analog signal corresponding to the exposure value, thereby the errors due to the circuit components of the integrator circuit are cannelled with each other to assist in the further improvement of the exposure control accuracy.

What is claimed is:
1. An exposure control device comprising:
   a. a first circuit for converting an exposure factor into an analog signal which represents the exposure factor,
   b. an analog-digital converter for converting said analog signal into a digital signal, said analog-digital converter including:
   1. an integrating circuit for integrating an input signal to produce a time-variable output signal having a slope dependent upon the input signal level,
   2. an analog signal source having an analog signal of a predetermined reference level and of opposite polarity to that of the analog signal of said first circuit,
   3. changeover means for applying selectively either of the analog signals of said first circuit and said analog signal source to said integrating circuit,

4. a control circuit for controlling operation of said changeover means in such a manner that after a predetermined time interval from the time of application of the analog signal from said first circuit to said integrating circuit, said control circuit produces an output which actuates said changeover means to cause the application of the analog signal from said analog source to said integrating circuit,
5. a pulse generator for producing pulses at a predetermined frequency,
6. counter means for counting pulses,
7. gate means responsive to the output of said control means to pass the pulses from said pulse generator to said counter means, and
8. output detecting means coupled to the output terminal of said integrating circuit upon attainment of the output of said integrating circuit to a predetermined level for producing an output; and c. exposure control means coupled to said counter means for controlling the amount of exposure of a photographic film in accordance with the content of said counter means corresponding to the number of pulses counted by said counter means.

2. An exposure control device according to 1, wherein said integrating circuit is a Miller integrating circuit including an operational amplifier and a condenser.

3. An exposure control device according to claim 1, wherein said first circuit includes a sensor circuit comprising a light-receiving means, an amplifier circuit for amplifying the output of said light-receiving means, and logarithmic compression means connected to said amplifier circuit.

4. An exposure control device according to claim 1, wherein said first circuit includes a sensor circuit for producing an output corresponding to the level of brightness of an object being photographed, film sensitivity information producing means for producing an output corresponding to the sensitivity of the associated film, and a computing circuit responsive to the outputs of said sensor circuit and said film sensitivity information producing means for deriving an exposure value.

5. An exposure control device according to claim 1, wherein said output detecting circuit is a comparator having two input terminals, one of which is connected to said integrating circuit, and the other of which is supplied with zero potential.

6. An exposure control device according to claim 1, wherein said gate means is an AND gate.

7. An exposure control device according to claim 1, wherein said counter means is a binary counter.

8. An exposure control device comprising:
a. a first circuit for converting an exposure factor into an analog signal which represents the exposure factor, and
b. an analog-digital converter for converting said analog signal into a digital signal, said analog-digital converter including:
1. an integrating circuit for integrating an input signal,
2. an analog signal source for producing an analog signal of a reference level opposite in polarity to the analog signal produced from said first circuit,
3. means for actuating said integrating circuit,
4. selectively connecting means for selectively connecting either of said first circuit and said analog signal source to said integrating circuit,
5. control means actuable in synchronism with the actuation of said integrating circuit for producing an output after the duration of a predetermined time interval, said selectively connecting means causing the connection of said integrating circuit from said first circuit to said analog signal source in response to the output of said control means, whereby said integrating circuit integrates the output of said first circuit during a time interval determined by said control means, and then, after said predetermined time interval, connected to said analog signal source to perform an inverted integration,
6. a voltage detecting circuit connected to the output terminal of said integrating circuit upon attainment of the detected output of said integrating circuit to a predetermined level for producing an output,
7. pulse generating means for producing pulses at a predetermined frequency,
8. counter means for counting pulses, and
9. gate means connected between said pulse generating means and said counter means to be opened when said control means produces an output and to be closed when said voltage detecting circuit produces an output; and c. exposure control means connected to said counter means for controlling the amount of exposure of the associated film in accordance with the content of said counter corresponding to the number of pulses counted by said counter.

9. An exposure control device according to claim 8, wherein said integrating circuit is a Miller integrating circuit including an operational amplifier and a condenser connected in the feedback network of said operational amplifier.

10. An exposure control device according to claim 8, wherein said means for actuating said integrating circuit is switching means connected in parallel with said condenser.

11. An exposure control device according to claim 8, wherein said predetermined time interval terminating at the production of output of said control means is longer than the period of time of illumination variation.

12. An exposure control device according to claim 8, wherein said predetermined time interval terminating at the production of output of said control means corresponds to an integer times the period of time of illumination variation.

13. An exposure control device according to claim 11, wherein said predetermined time interval is not less than 10 milliseconds.

14. An exposure control device according to claim 8, wherein said exposure control means includes:
a. pulse generating means for producing pulses at a predetermined frequency,
b. second counter for counting the pulses from said pulse generating means,
c. a coincidence detecting circuit connected between said counter and said second counter upon establishment of a predetermined relation between the contents of said both counters to produce an output, and
d. shutter driving means connected to said coincidence detecting circuit upon production of the output therefrom to drive shutter closing means.

15. An exposure control device according to claim 14, wherein said coincidence detecting circuit has a function of converting the digital code stored in said counter to a logarithmically extended digital code corresponding to the number of pulses counted by said second counter.

* * * * *